United States Patent [19]

Yamada

[11] Patent Number: 4,592,883
[45] Date of Patent: Jun. 3, 1986

[54] PROCESS FOR TREATING MOLDED, POROUS CARBON ARTICLE

[75] Inventor: Okimasa Yamada, Kitaibaraki, Japan

[73] Assignee: Nippon Mektron Ltd, Tokyo, Japan

[21] Appl. No.: 662,888

[22] Filed: Oct. 19, 1984

[30] Foreign Application Priority Data

Oct. 21, 1983 [JP] Japan ................ 58-197442

[51] Int. Cl.$^4$ .................. C04B 40/00; C01B 31/00
[52] U.S. Cl. ............................ 264/82; 264/29.5; 423/445
[58] Field of Search ............. 264/82, 83, 29.5, 43, 264/44, DIG. 63; 423/445

[56] References Cited

U.S. PATENT DOCUMENTS 4,366,191 12/1982 Gistinger et al. ............... 264/29.5

FOREIGN PATENT DOCUMENTS 53-130327 10/1981 Japan .

*Primary Examiner*—George Yeung
*Attorney, Agent, or Firm*—Fred Philpitt

[57] ABSTRACT

When a molded, porous carbon article for use as a sliding material for bearing, etc. is maintained in a stream or atmosphere of a fluorine gas or a fluorine gas diluted with an inert gas, the surface of the article is treated with the fluorine gas, and considerable lowering of friction coefficient and considerable reduction in abrasion at the sliding can be attained.

4 Claims, No Drawings

PROCESS FOR TREATING MOLDED, POROUS CARBON ARTICLE

BACKGROUND OF THE INVENTION

1. Field of the Invention

This invention relates to process for treating a molded, porous carbon article, and more particularly to a process for lowering the surface frictional resistance of a molded, porous carbon article for use as a sliding material, etc., thereby improving the sliding durability, etc. of the article 2. Description of Prior Art A molded carbon article, when used as a sliding material, etc., shows much abrasion and generates a large amount of abrasion powder. Thus, its use is restricted. If the surface friction coefficient of the article can be lowered, such problems may be solved, and also if the thickness of the layer treated to lower the surface friction coefficient can be increased, the durable time may be increased.

Heretofore, a solid lubricant such as molybdenum disulfide, etc. has been used to lower the surface friction coefficient of a molded carbon article. The solid lubricant is effective during the initial period of use, but no continued effect can be extended for a long time. Furthermore, the molded carbon article is liable to be pulverized and scattered, resulting in fouling. In this respect, its use is also restricted.

To lower the surface frictional resistance of a molded rubber article for use also as a sliding material, etc. like the molded carbon article, it is disclosed in Japanese Patent Application Kokai (Laid-open) No. 56-126,146 to treat the surface of a molded rubber article with a fluorine gas or a fluorine gas diluted with an inert gas. When this treatment is applied to a molded, non-porous carbon article in the same manner as for the molded rubber article, no desirable effect can be obtained, as will be shown in Comparative Example 1 which follows.

Furthermore, it is likewise disclosed in Japanese Patent Publication No. 54-36630 to treat the surface of a molded rubber article with antimony pentafluoride. When this treatment is applied to the surface treatment of a molded, porous carbon article, no effect can be obtained at all, as will be shown in Comparative Example 2 which follows.

Still further, it is disclosed in Japanese Patent Application Kokai (Laid-open) No. 53-130,327 to embed a carbon fiber-filled carbonaceous vessel in a molten salt electrolytic bath of acidic hydrogen potassium fluoride (HF.KF), conduct electrolysis of the molten salt while using the carbonaceous vessel as an anode, and introduce a fluorine gas generated at the anode in between the carbon fibers, thereby fluoridizing the surface layers of the carbon fibers. When this treatment is applied to a molded, porous carbon article, no desirable surface treatment can be obtained due to too vigorous fluorization reaction on the contrary.

SUMMARY OF THE INVENTION

An object of the present invention is to provide a process for treating a molded, porous carbon article, which can lower the surface frictional resistance considerably and also can maintain such lowered frictional resistance over a long period of time.

Another object of the present invention is to provide a process for treating a molded, porous carbon article, which can reduce the abrasion considerably and can improve the sliding durability when used as a sliding material.

These objects of the present invention can be attained by maintaining a molded, porous carbon article in a stream or atmosphere of a fluorine gas at a temperature of about 10° to about 200° C.

DETAILED DESCRIPTION OF THE PREFERRED EMBODIMENTS

Molded, porous carbon articles for treatment in the present process include, for example, sliding machine parts such as a bearing, etc., and are usually prepared by mixing a filler such as natural graphite, artificial graphite, coke, etc. with a binder such as coal tar pitch, resin, etc., followed by kneading, pulverization and molding under pressure, and heat-treating the molded articles at a temperature of about 1,000° to about 3,000° C. The thus prepared molded, porous carbon articles have a porosity of about 1 to about 40%, depending on the control of the carbonization ratio of the binder and the molding procedure. For application as a material for machine parts, the articles having a porosity of about 1 to about 20%, preferably about 2 to about 18%, are used. The pore size also depends upon the species of raw materials, particle size at pulverization, carbonization ratio of binder, etc. For application as sliding machine parts, the pore size is about 1 to about 30 $\mu$m, preferably 2 to 25 $\mu$m, and for application to parts of automobiles, aircraft, etc., the pore size is below about 0.1 mm. Furthermore, when a molded article is in a cylindrical form, the diameter is about 100 mm as maximum. However, in the application to parts of automobiles, aircrafts, etc. it is possible to use as diameter as large as 1 m.

The molded, porous carbon articles are treated with a fluorine gas in the following manner.

A molded, porous carbon article is placed in a reaction tank, contacted with a fluorine gas therein, and then washed with an aqueous solution of about 5 to about 20% by weight of an alkali metal carbonate to remove the unreacted fluorine gas from the article, and then washed with water, and dried.

The fluorine gas is a single fluorine gas or a fluorine gas diluted with an inert gas such as helium, argon, nitrogen, carbon tetrafluoride, etc. to about 100-fold, and is contacted with the molded, porous carbon article as a gas stream or atmosphere under atmospheric pressure or a superatmospheric pressure up to about 3 atmospheres, or a subatmospheric pressure down to about 0.01 atmosphere for about 0.1 to about 10 hours. The treating temperature is about 10° to about 200° C., preferably about 20° to 150° C., depending upon the species of porous carbon material and the desired degree of treatment. A higher temperature is preferable from the viewpoint of workability.

The washing with an aqueous solution of alkali metal carbonate after the fluorine gas treatment is carried out for about 5 to about 30 minutes, preferably about 10 to about 15 minutes, and then the water washing is carried out for about 10 to about 15 minutes. The drying is carried out with hot air.

When such a fluorine gas treatment is applied to a molded, porous carbon article, the surface friction coefficient of the article is lowered considerably and the lowered frictional resistance can be maintained over a long period of time, because not only the surface layer of the article, but also the surface layer of the pores within the article can be fluoridized by the treatment of molded, porous article with the fluorine gas, and thus the thickness of the treated layer can be increased and the effect of lowering the friction coefficient can be maintained. With the lowered friction coefficient, the abrasion can be considerably reduced, so that the sliding durability of the molded, porous carbon article for use as a sliding material, etc. can be effectively increased.

The present invention will be described in detail below, referring to examples.

EXAMPLE 1

Into a reaction tank having a capacity of 20 l were placed 10 porous carbon cylinders (16 mm in I.D, 19.6 mm in O.D. and 45 mm high) having a porosity of 16% and pore sizes of 15–22 μm, as heat-treated at 2,500° C. A fluorine gas diluted with a nitrogen gas to the concentration of 40% was filled in the reaction tank up to the atmospheric pressure, and left therein at 100° C. for 4 hours. Then, the fluorine gas was removed from the reaction tank, and the porous, sintered carbon articles were taken out of the reaction tank, washed successively with an aqueous 10% sodium carbonate solution and with water, and dried with hot air.

The friction coefficient and abrasion of the porous, sintered carbon articles treated with the fluorine gas in this manner were measured under the following conditions:

Suzuki-type, vertical abrasion tester
Mating surface: S45C, HRC 30-40, Surface roughness
1.6 S. Load: 15 kg/cm$^2$, Speed: 1 m/sec
Continued operation: 4 hours

COMPARATIVE EXAMPLE 1

10 substantially non-porous, sintered carbon cylinders having the same dimensions as in Example 1 and having a porosity of 0.5%, as heat-treated at 1,200° C. were treated in the same manner as in Example 1, and the friction coefficient and abrasion were measured in the same way.

The measurement results as an average of 10 test pieces are shown in the following Table 1.

As obvious from Table 1, the surface friction coefficient was lowered by about 36% and the abrasion was also reduced by about 38% in the case of fluorine gas-treated porous carbon articles, whereas in the case of non-porous carbon articles, both the friction coefficient and abrasion were reduced by about 20% by the fluorine gas treatment, but the figures themselves were so high that the desired effect could not be attained.

TABLE 1

| | Fluorine gas treatment | Friction coefficient (μ) | abrasion (mm) |
|---|---|---|---|
| Example 1 | done | 0.09 | 0.05 |
| Example 1 | none | 0.14 | 0.08 |
| Comp. Ex. 1 | done | 0.13 | 0.09 |
| Comp. Ex. 1 | none | 0.17 | 0.11 |

EXAMPLES 2-3

Fluorine gas treatment was carried out in the same manner as in Example 1, except that the fluorine gas-treating conditions were varied, and the friction coefficient and abrasion were measured as before. The results are shown in Table 2.

TABLE 2

| | Fluorine gas treatment | | Friction coefficient (μ) | Abrasion (mm) |
|---|---|---|---|---|
| | Temp. (°C.) | Time (hour) | | |
| Example 2 | 30 | 15 | 0.10 | 0.05 |
| Example 3 | 130 | 2 | 0.09 | 0.06 |

COMPARATIVE EXAMPLE 2

Fluoridization treatment was carried out in the same manner as in Example 1, except that antimony pentafluoride diluted with a nitrogen gas to the same concentration as in Example 1 was used in place of the nitrogen gas-diluted fluorine gas.

The nitrogen gas-diluted antimony pentafluoride was generated in an aluminum vaporizer (30 cm in diameter and 40 cm high) with an electric heating jacket. The vaporizer is provided with a pipe for introducing a carrier gas (nitrogen gas) and a pipe for withdrawing gas. The pipe for introducing the carrier gas is extended nearly to the bottom of the vaporizer, so that the introduced nitrogen gas can bubble through liquid antimony pentafluoride.

The fluoridization treatment was conducted by charging 10 kg of liquid antimony pentafluoride into the vaporizer, introducing nitrogen gas when the temperature of antimony pentafluoride reached 40° C. by heating through the electric heater, thereby conducting bubbling, and filling the nitrogen gas-diluted antimony pentafluoride gas discharged from the vaporizer into the reaction tank having a capacity of 20 l up to the atmospheric pressure and leaving the gas staying therein at 100° C. for 4 hours. Then, the diluted antimony pentafluoride gas was removed from the reaction tank, followed by post-treatments in the same manner as in Example 1.

The friction coefficient and abrasion of the thus antimony pentafluoride-treated porous, sintered carbon articles were measured under the same conditions as in Example 1. It was found that the friction coefficient (μ) was 0.14 and the abrasion (mm) was 0.08, which were not different from the figures before the treatment.

What we claim is:

1. A process for improving the surface frictional resistance of a molded porous carbon article with pores having pore sizes of about 1 μm to about 30 μm and a porisity of about 1% to about 20% which comprises treating said article in a stream or atmosphere of fluorine gas at a temperature of about 10° C. to about 200° C.

2. A process according to claim 1 wherein the fluorine gas is diluted with an inert gas.

3. A process according to claim 1 wherein said treatment is carried out from about 0.1 to about 10 hours.

4. A molded, porous carbon article having pore size of about 1 μm to about 30 μm and a porosity of about 1% to about 30%, and which has been treated in a stream or atmosphere of fluorine at a temperature of about 10° C. to about 200° C.

* * * * *